United States Patent
Chennuru et al.

(10) Patent No.: US 10,922,357 B1
(45) Date of Patent: Feb. 16, 2021

(54) AUTOMATICALLY MAPPING NATURAL LANGUAGE COMMANDS TO SERVICE APIS

(71) Applicant: Amazon Technologies, Inc., Seattle, WA (US)

(72) Inventors: Ramapulla Reddy Chennuru, Sunnyvale, CA (US); Miles Clark, Sunnyvale, CA (US); Niti S. Khadapkar, Sunnyvale, CA (US); Jagruti Patil, Sunnyvale, CA (US); Anup P. Pandya, San Jose, CA (US); Srinivasan Ramkumar, Milpitas, CA (US); Ekanth Sethuramalingam, Milpitas, CA (US)

(73) Assignee: Amazon Technologies, Inc., Seattle, WA (US)

( * ) Notice: Subject to any disclaimer, the term of this patent is extended or adjusted under 35 U.S.C. 154(b) by 19 days.

(21) Appl. No.: 15/835,333

(22) Filed: Dec. 7, 2017

(51) Int. Cl.
| | |
|---|---|
| *G06F 40/30* | (2020.01) |
| *G10L 15/183* | (2013.01) |
| *G06F 16/9032* | (2019.01) |
| *G10L 15/26* | (2006.01) |
| *G10L 15/22* | (2006.01) |
| *G06F 16/2457* | (2019.01) |

(52) U.S. Cl.
CPC .... *G06F 16/90332* (2019.01); *G06F 16/2457* (2019.01); *G10L 15/183* (2013.01); *G10L 15/22* (2013.01); *G10L 15/26* (2013.01); *G10L 2015/223* (2013.01); *G10L 2015/227* (2013.01)

(58) Field of Classification Search
CPC .......... G06F 16/3344; G06F 16/24522; G06F 16/3329; G06F 17/28; G06F 16/243; G06F 17/274; G06F 17/275; G10L 15/19; H04M 2250/74
USPC ...................................................... 704/9, 257
See application file for complete search history.

(56) References Cited

U.S. PATENT DOCUMENTS

| | | | |
|---|---|---|---|
| 8,762,156 B2 | 6/2014 | Chen | |
| 9,015,730 B1* | 4/2015 | Allen | G06F 9/541 |
| | | | 719/313 |
| 2008/0235022 A1 | 9/2008 | Bergl et al. | |
| 2013/0275164 A1 | 10/2013 | Gruber et al. | |
| 2014/0278413 A1 | 9/2014 | Pitschel et al. | |
| 2015/0066479 A1* | 3/2015 | Pasupalak | G06F 40/20 |
| | | | 704/9 |

* cited by examiner

*Primary Examiner* — George C Monikang
(74) *Attorney, Agent, or Firm* — Robert C. Kowert; Kowert, Hood, Munyon, Rankin & Goetzel, P.C.

(57) ABSTRACT

Natural language commands are automatically mapped to application programming interface (API) functions of web-based services. Grammatical rules may be applied to the APIs in order to classify the actions of the APIs, in some embodiments, generating mappings between the natural language commands and the APIs. When a natural language input is received and a natural language command identified form the natural language input, the corresponding API indicated in the mapping may be invoked.

20 Claims, 7 Drawing Sheets

AUTOMATICALLY MAPPING NATURAL LANGUAGE COMMANDS TO SERVICE APIS

BACKGROUND

Web-based service offerings continue to expand the ability of users to perform various kinds of tasks or operations utilizing resources hosted and managed by other entities. Interactions with web-based services may rely upon programmatic interfaces, such as Application Programming Interfaces (APIs) to invoke otherwise trigger the performance of various functions at a service on behalf of a user. Because web-based services underlie the operation many different systems, other interfaces for interacting with the services may prove beneficial in addition to APIs. Techniques for enhancing the interfacing capabilities between users and the services are thus highly desirable.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of extensible resource compliance management are described herein. Network or other web-based services offer users the potential to perform a variety of tasks and utilize different resources, as discussed below with regard to FIGS. 1 and 2, in some embodiments. The interfaces of such services may support application programming interfaces (APIs) in order to allow users to request the performance of the tasks and utilization of the resources, in some embodiments. APIs, however, may depend upon a user having access to a console or other application on a computing device, such as computing device 1000 in FIG. 7, and performing specific interactions (e.g., typing or selecting a particular command) to invoke the APIs to make desired requests of the web-based services. Natural language commands, however, may allow a user to request the performance of various web-based service functionalities without utilizing a fully and/or valid formed API request, in various embodiments. For example, instead of formulating specific API requests to "DescribeResource ('A123'), a natural language request could allow for various formulations to obtain the same descriptive functionality (e.g., "Tell me about 'A123' or "What is the configuration of 'A123'?").

Automatically mapping natural language commands to service APIs may be performed in various embodiments to eliminate costly development efforts to implement natural language functionality for interfacing with web-services, in various embodiments. Instead, grammatical rules may be applied to evaluate APIs to provide mappings between natural language commands and the APIs in order to implement natural language functionality without manual coding or development, in various embodiments. Moreover, common grammar rules can be used to develop common interactions to perform different functions for different services so that users are not burdened with the task of learning different interactions for each service, in various embodiments. For example, operations that transfer, copy, replicate, extract, or otherwise move data using different services can be invoked using similar natural language commands (e.g., "Move 'Table A' from database 'A' to database 'B' in database service" may be similar to "Move 'File A' from directory 'A' to directory 'B' in file system service").

Figure 1:
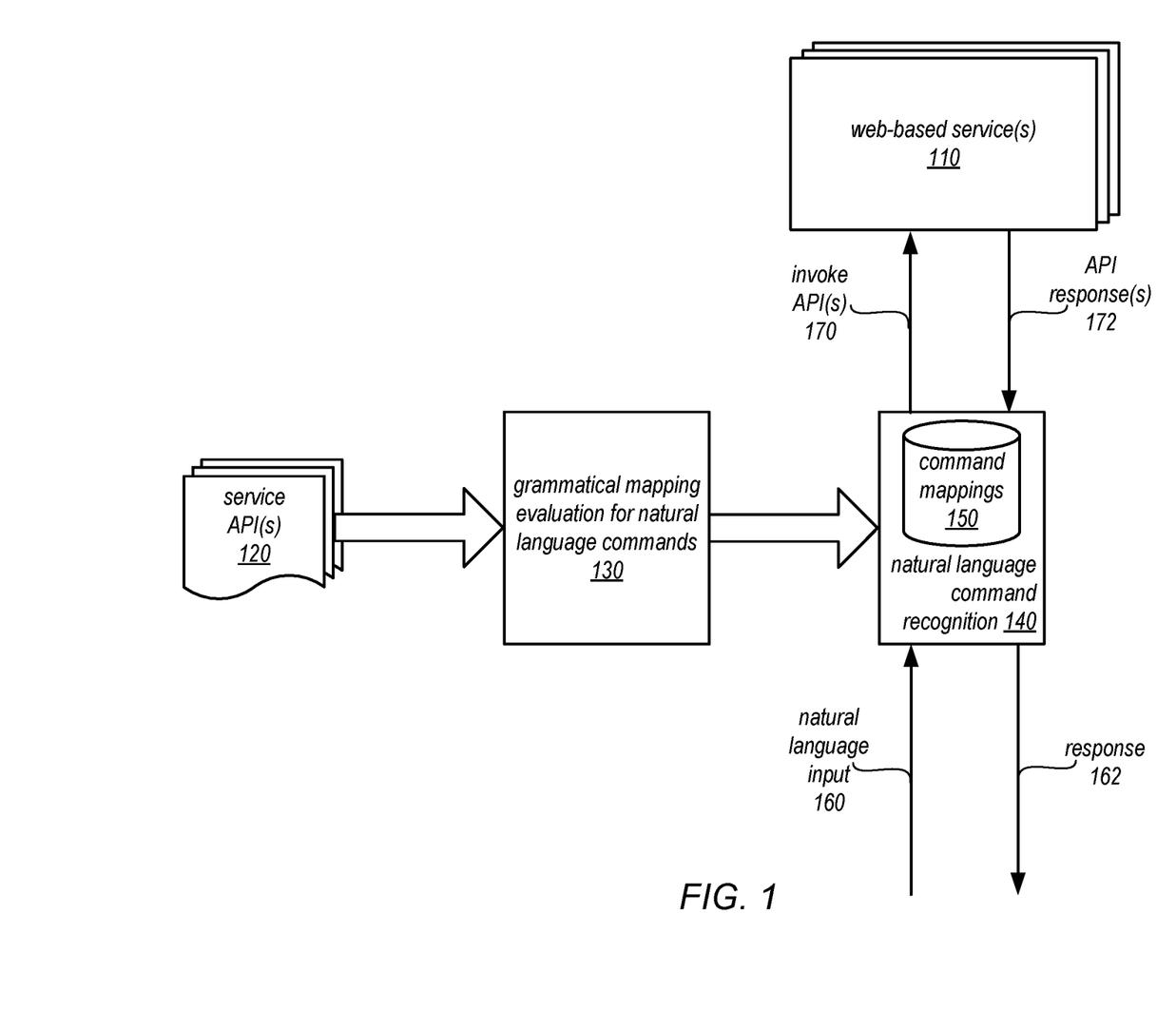
FIG. 1 illustrates a logical block diagram of automatically mapping natural language commands to service application programming interfaces (APIs), according to some embodiments.

FIG. 1 illustrates a logical block diagram of automatically mapping natural language commands to service application programming interfaces (APIs), according to some embodiments. Web-based service(s) 110 may offer users a variety of different computing, storage, networking, processing or other resources that can perform different tasks or other functionalities on behalf users that can communicate or invoke performance of service functionalities using service Application Programming Interface (API) 120. For example, service APIs 120 can trigger operations to create resources, check the status of jobs or operations being performed, modify or update data, initiate tasks, among other functionalities offered by web-based service(s) 110.

Service API(s) 120 may be evaluated to map the service API(s) 120 to natural language commands using one or more grammatical rules 130, in various embodiments. For example, grammatical rules may identify or otherwise classify actions of the functionalities invoked by API(s) 120 to map those actions to a set of verbs and/or subjects, in some embodiments. Consider, for instance, the example terms "transfer," "copy," "replicate," "extract," or "move" for the example operations above that move data. Any of these terms may be interchangeable to accomplish a table copy operation for a database service according to the grammatical rules for mapping API(s) 120, for instance, even though the term "COPY" would have to be specified in accordance with the API 120 to directly invoke the functionality to copy the table using the API 120. Likewise, another API 120 that specifies a file transfer between one directory another directory may be likewise mapped to similar natural language command mappings that allow for multiple terms to accomplish the transfer (e.g., "Copy file A to directory B"). In other embodiments, grammatical rules may map similar operations to a single (or smaller subset of terms). For instance, "move" may be a natural language command that can invoke the table copy or file transfer (depending on the specified subject, table or folder).

Command mappings 150 for invoking API(s) 120 may be created, generated, and/or stored based on the grammatical mapping evaluation, in various embodiments. A natural language command recognition 140 platform, system, or service, such as voice interface service 202 discussed below with regard to FIG. 2, may rely upon command mappings 150 in order to recognize natural language commands for web-based service(s) 110. For example, natural language input 160 (e.g., via text, voice capture, or other natural language capture technique) may be provided to natural language command recognition system 140. Natural language command recognition 140 may perform speech recognition or other natural language processing techniques to parse and recognize the invocation of a natural language command, which can be used to invoke a corresponding API 170 identified according to command mapping(s) 150. For example, a request to "Get a list of my active servers in a virtual computing service" may be received as input 160, mapped 150 to an API to retrieve a server resource listing for a user account associated with the natural language input. The API may be invoked 170 (e.g., "GetServerList(user A, server state='active') by natural language command recognition system 140. Web-based service 110 may send an API response 172, which may include a list of servers in a format specified according to the API (e.g., {'server123a', 'server123b', 'server 123c'}). Natural language command recognition system 140 may, in some embodiments, interpret the API response 172 and provide a natural language response 162.

As new web-based services 110 become available, or new features or functionalities are added to existing web-based services 110, service API(s) 120 may be evaluated according to the grammatical rules 130 to add or update command mappings 150. In this way, adding natural language interactions to trigger service functionalities can be extended to new services using grammatical rules consistent with other web-based services. In some embodiments, additional interactions (not illustrated) may be implemented to allow web-based service operators, owners, or stakeholders with the ability to manually create, update, add, or remove command mappings for natural language command recognition 140.

Please note that the previous description of automatically mapping natural language commands to service application programming interfaces (APIs) is a logical illustration and thus is not to be construed as limiting as to the implementation of a web-based services, service APIs, grammatical rules for evaluating and mapping service APIs, or natural language command recognition.

This specification begins with a general description of a provider network that implements a voice interface service that provides automatically mapping natural language commands to service application programming interfaces (APIs) for other services hosted in the provider network. Then various examples of a voice interface service including different components/modules, or arrangements of components/module that may be employed as part of implementing the services are discussed. A number of different methods and techniques to implement automatically mapping natural language commands to service application programming interfaces (APIs) are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
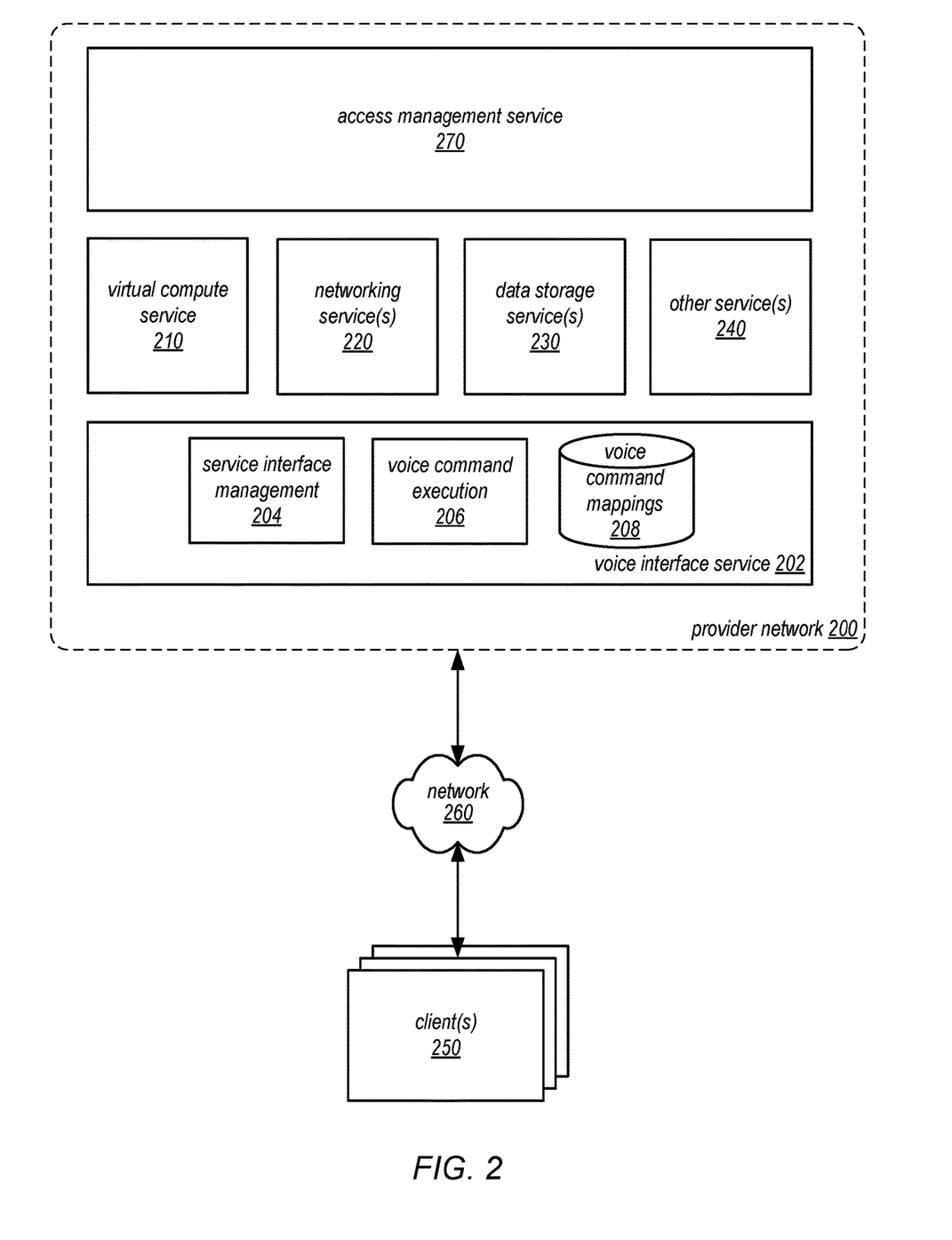
FIG. 2 is a logical block diagram illustrating a provider network offering a voice interface service that implements automatic mapping of natural language commands to APIs for other services hosted in the provider network, according to some embodiments.

FIG. 2 is a logical block diagram illustrating a provider network offering a voice interface service that implements automatic mapping of natural language commands to APIs for other services hosted in the provider network, according to some embodiments. Provider network 200 may be a private or closed system or may be set up by an entity such as a company or a public sector organization to provide one or more services (such as various types of cloud-based storage) accessible via the Internet and/or other networks to clients 250, in some embodiments. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 7), needed to implement and distribute the infrastructure, storage, and other computing resource services offered by the provider network 200. In some embodiments, provider network 200 may implement various computing resources or services, such as a virtual compute service 210, networking service(s) 220, data storage service 230, access management service 270, voice interface service 202, and other services 240, which may include data processing service(s), (e.g., relational or non-relational (NoSQL) database query engines, map reduce processing, data flow processing, and/or other large scale data processing techniques), and/or other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 7 and described below. In various embodiments, the functionality of a given system or service component (e.g., a component of voice interface service 202) may be implemented by a particular node or may be distributed across several nodes. In some embodiments, a given node may implement the functionality of more than one service system component (e.g., more than one data store component).

Virtual compute service 210 may be implemented by provider network 200, in some embodiments. Virtual computing service 210 may offer instances and according to various configurations for client(s) 250 operation, which a user may obtain, configure, launch, or otherwise manage using various APIs. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances and of provider network 200 in different embodiments, including general purpose or special purpose computer servers, storage devices, network devices and the like. In some embodiments instance client(s) 250 or other any other user may be configured (and/or authorized) to direct network traffic to a compute instance.

Compute instances may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client (s) 202 applications, without for example requiring the client(s) 250 to access an instance. Applications (or other software operated/implemented by a compute instance and may be specified by client(s), such as custom and/or off-the-shelf software.

In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length. Compute instance configurations may include security policies, network port configuration, or any other configuration of the virtual compute instance (or underlying hardware of the host).

In some embodiments, virtual compute service 210 may implement operating system virtualization or containers as a service. Containers may allow users to run applications on a managed cluster of virtual compute instances, in some embodiments. Containers hosted by virtual compute service 210 may perform and manage installation, operation, and scaling of user identified containers (e.g., as a cluster) on behalf a user, in some embodiments. API calls may obtain, configure, launch and stop container-enabled applications, query the state of your containers (or a group of containers, such as a cluster), and access many familiar features for managing containers (e.g., security features, network or traffic routing, storage, and authorization or other access management features), in some embodiments. Virtual compute service 210 may schedule the placement of containers based on user needs and availability requirements, or rely upon a user-specified scheduler to hosted, application specific requirements, in some embodiments.

Networking service(s) 220 may include various kinds of network traffic control services, such as virtual load balancing resources, in some embodiments. For example, a load balancing service may automatically distribute incoming traffic across multiple computing resources, such as compute instances. The load balancing service may provide fault tolerance for applications executing on computing resources and may provide the required amount of load balancing capacity needed to route application traffic, in some embodiments. For example, the load balancing service may detect unhealthy resources and reroute traffic across the remaining healthy resources. The load balancing service may automatically scale load balancer request handling capacity to meet the demands of traffic, in some embodiments. Various APIs may invoke functionalities of networking service(s) to configure or perform the network features discussed above, in some embodiments.

Networking service(s) 220 may also include various kinds of network security services. For example, a network security service may allow users to provision a logically isolated section of the provider network 200 where a user can launch computing resources in a virtual network that is user-defined. The network security service may provide controls for a user to manage the networking environment of the network, such as controls to select an Internet Protocol (IP) address range, create subnets, and configure route tables and network gateways, in some embodiments. The network security service may allow a user to different protocols, such as IPv4 and IPv6, access resources in the virtual private network. For example, a user can create a public-facing subnet for computing resources acting as webservers that has access to a public network like the Internet, and place backend systems such as databases or application servers in a private-facing subnet with no Internet access. The network security service may allow users to implement multiple layers of security, including security groups and network access control lists, to help control access to computing resources in each subnet. Compliance schemes may include various conditions, states, or configurations enforced or applied by resources in networking service(s) 220.

Data storage service(s) 230 may implement different types of data stores for storing, accessing, and managing data on behalf of clients 250 as a network-based service that enables clients 250 to operate a data storage system in a cloud or network computing environment. For example, data storage service(s) 210 may include various types of database storage services (both relational and non-relational) or data warehouses for storing, querying, and updating data. Such services may be enterprise-class database systems that are scalable and extensible. Queries may be directed to a database or data warehouse in data storage service(s) 230 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

Data storage service(s) 230 may also include various kinds of object or file data stores for putting, updating, and getting data objects or files, which may include data files of unknown file type. Data storage service(s) 210 may be accessed via programmatic interfaces (e.g., APIs) or graphical user interfaces. Data storage service(s) 210 may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI).

Other services 240 may include various types of data processing services to perform different functions (e.g., anomaly detection, machine learning, querying, or any other type of data processing operation). For example, in at least some embodiments, data processing services may include a map reduce service that creates clusters of processing nodes that implement map reduce functionality over data stored in one of data storage services 230. Various other distributed processing architectures and techniques may be implemented by such data processing services (e.g., grid computing, sharding, distributed hashing, etc.). Other services may include services like a resource scaling service which may maintain application or other resource availability for provider network 200 resources, allowing dynamic scaling of resources, such as virtual compute instances, scaling capacity up or down automatically according to defined conditions, in some embodiments. The resource scaling service may ensure the health and availability of collections of resources implementing various services or applications, by launching and running a desired number of resources, in some embodiments. The resource scaling service may automatically increase the number of resources during demand spikes to maintain performance and decrease capacity during lulls to reduce costs, in some embodiments.

Access management service 270 may allow users to control access to provider network 200 services and resources for one or multiple users. Using access management service 270, permissions of individual users and groups of users can be identified, specified, and managed, to allow and deny their access to provider network 200 resources. For example, access management service 270 can enable (or disable) user access for specific service APIs and to specific resources (e.g., allow status checks but not commands to delete data or stop performance). Access management service 270 may allow a user to add specific conditions such as time of day to control how a user can use resources in provider network 200, the originating network address, whether communication attempts are encrypted, or the mechanisms for authentication (e.g., voice print, voice Completely Automated Public Turing Test To Tell Computers and Humans Apart (CAPTCHA), multi-factor authentication, among others).

Voice interface service 202, as discussed in detail below with regard to FIGS. 3-4, may allow users to use natural language commands in voice input to interface with other provider network services, such as virtual compute service 210, networking service(s) 220, data storage service(s) 230, and other service(s) 240, invoking APIs for the services as part of voice command execution 206 based on the voice command mappings 208. Voice interface service 202 may implement automatically mapping natural language commands to service application programming interfaces (APIs), in various embodiments, as part of service interface management 204.

Generally speaking, clients 250 may encompass any type of client configurable to submit network-based requests to provider network 200 via network 260, including requests to submit APIs for automatic mapping to voice interface service 202. For example, a given client 250 may include a suitable version of a web browser, or may include a plug-in module or other type of code module that may execute as an extension to or within an execution environment provided by a web browser. Alternatively, a client 250 may encompass an application such as a voice capture device as discussed below with regard to FIG. 4, which may provide voice data or inputs (and receive back voice data or responses) via network 260 from voice interface service 202. Clients 250 may include a media application, an office application or any other application that may make use of resources in provider network 200 to implement various applications. In some embodiments, an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. For example, client 250 may integrate with an operating system or file system to provide storage on a data storage service of provider network 200. However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service may be coordinated by client 250 and the operating system or file system on behalf of applications executing within the operating system environment. In some embodiments, client(s) 250 may include systems or devices, such as voice capture device 410 in FIG. 5, which may provide natural language inputs to voice interface service 202 via network 260.

Clients 250 may convey network-based services requests (e.g., to invoke APIS or other service functionalities) to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Voice interface service 202 may provide a platform for enabling voice-based interactions with different services offered by provider network 200. Voice interface 202 may implement service interface management 204 to allow stakeholders, developers, managers, or other users associated with the implementation and offerings provided by various network services to enable, manage, and/or disable voice interactions with the services using a common grammar. In this way, different development teams need not be aware of how other teams are implementing voice interactions as automated mappings according to the common grammar may enforce conformity so that interactions for the different services are similar (and thus less confusing for users), in some embodiments. FIG. 3 is a logical block diagram illustrating service interface management for a voice interface service, according to some embodiments.

Service interface management 204 may implement an interface 302 (e.g., a command line interface, graphical user interface, or programmatic interface) which may allow users to submit API(s) 350 for a service for mapping to natural language commands, in various embodiments. The API(s) 350 may be specified as a document (e.g., a Javascript Object Notation (JSON) document, extensible markup language (XML)) in human-readable format or as code, instructions, or other machine-readable format, in some embodiments. In some embodiments, software development kit (SDK) files may be submitted, inclusive of multiple APIs. In some embodiments, only select APIs (as opposed to all APIs) for a service may be submitted (e.g., by individual submitting APIs for mapping or in groups that do not include APIs which are not to be mapped).

Service interface management 204 may implement API parser 310 to identify the various features of an API. For example, the API parser may separate out the features of an API command, such as the action (e.g., create, update, move, delete, etc.), the resource (e.g., how the resource should be identified, such as by identifier, state, status, or other criteria), and other parameters or values that may be needed to properly invoke the API. A parse tree or other data structure identify the different API features may be generated, in various embodiments, and provided 312 to mapping engine 320.

Service interface management 204 may implement mapping engine 320 to evaluate parsed APIs 312 and determine mappings for the API and voice commands. Mapping engine 320 may apply 332 grammatical rules 330 to provide a framework for consuming parsed APIs 312 and generating voice command mappings 208, in various embodiments, as discussed below with regard to FIGS. 5 and 6. For example, grammatical rules may specify categories of actions, which may be mapped to API so that voice commands that utilize words or phrases associated with the action may be mapped to the API. Grammatical rules 330 may be used to map the ways in which resources, tasks, operations, or other objects of the API command can be identified using natural language input, in some embodiments. For example, types, names, or other descriptive information to identify or discover objects (e.g., "job," "server," "cluster," "data stream," "query," etc.) may be mapped to the objects of the API command, in some embodiments.

Mapping engine 320 may store 360 command mappings for voice commands in voice command mappings 208. Stored command mappings may identify which natural language commands (e.g., words or phrases) may be used to specify the different APIs. In some embodiments, the mappings may be stored to indicate the classification of the action of the API, the object (or objects) of the API, the source for parameter values (e.g., a user profile, voice input, user account information, etc.), or any other information to translate a recognized voice command as the invocation of an API.

Grammatical rules 330 may be defined as a rules-based model, in various embodiments, which may be applicable to perform API mappings. In some embodiments, grammatical rules 330 may change over time as natural language inputs changes. For example, as words enter into use in natural language, the grammatical rules 330 may be updated 342 to recognize or associate the words with appropriate APIs as part of voice command mappings 208. In some embodiments, grammatical rules may be updated by grammar rules trainer 340 which may implement machine learning based models for identifying grammatical rules applicable to invoke the performance of different APIs based on command recognition results 390. For example, a deep neural network may be implemented to recognize new key words or phrases within natural language input in order to determine the desired action, object, and/or other parameters that may be used to invoke an API. Note, however, that other grammar rule selections or update techniques may be implemented by grammar rules trainer 340, in some embodiments, and thus the above techniques are not intended to be limiting. Command recognition results 390 may be provided by voice command execution 206, in some embodiments.

As discussed below with regard to FIG. 6, some APIs 350 may not be mapped according to grammatical rules 330, in some embodiments. An indication of a mapping error (not illustrated) may be provided in response to the API submissions 350, in some embodiments. In some embodiments, the APIS may be identified for manual mapping. For example, service interface management 204 may implement manual command mapping 350 to allow mapping update requests 370 to create, change, or delete voice command mappings from voice command mappings 208. A user may, for instance, change a voice command mapping to classify an API as a "start" API instead of a "create" API. In some embodiments, new mappings may be created by associating additional natural language words or phrases with APIs which may be more specific to a particular API (instead of or in addition to words or phrases associated with a class of actions in which the API has been included). For example, specific task names that invoke specialized functions (e.g., specific conversion workflows for data), may be added so that a user that includes a name for the specialized function in the natural language input may be recognized as invoking the API to perform that specialized function. Manual command mapping 350 may access voice command mappings 208 to perform updates 380.

Voice interface service 202 may implement voice command execution 206 in order to invoke API requests for different provider network 200 services based on voice input. FIG. 4 is a logical block diagram illustrating voice command execution for a voice interface service, according to some embodiments. A voice capture device 410 may stream or otherwise send voice input (e.g., voice commands 480) to the voice interface service 202. In some embodiments, the voice capture may be prompted by detection of an audible "wake word" associated with the device 410, e.g., using voice input capture 412 (e.g., including one or more microphones or other audio detection components) to monitor audio in the vicinity of the device while the device is powered on and ready to capture audio. In one embodiment, the voice input capture 412 may be prompted by a button press, a gesture, or another suitable user interaction instead of a wake word. In one embodiment, after the wake word or other user-supplied prompt is detected, the voice input capture 412 may continue to record (and the device 410 may continue to stream) audio input until a pause of suitable duration is detected; until voice interface service 202 or voice command execution 206 instruct the device to stop; until a particular duration has been reached for the captured audio; or until a button press, gesture, or other suitable user interaction is received to end the voice capture.

In one embodiment, the voice input 412 may represent speech input from a user 402. The speech may include natural language speech. The voice input may represent digital audio in any suitable format. The voice input may be provided as one or more voice commands 480, which may be processed by the voice input analysis 420, e.g., by performing a speech-to-text operation to detect the presence of natural-languages terms in the input. In one embodiment, one or more of the terms may represent commands to invoke APIs for service(s) 400 (e.g., one or more of the services illustrated in FIG. 2) on behalf of user 402 or an account associated with user 402 of provider network 200. In one embodiment, one or more of the terms may represent data usable by skills or functionalities (e.g., as parameters or other information for invoking APIs). In some embodiments, voice commands 480 may include a help or other similar command to describe available voice command formulations for invoking one or multiple services 400.

In some embodiments, voice interface service 202 or provider network 200 may maintain user profiles 470 for users (which may be linked o or associated with devices such as the device 410) using a device management component. In one embodiment, user profiles 470 may be associated with user profile 470 identifiers (e.g., e-mail addresses) and device-specific access credentials (e.g., passwords) permitting the devices to access provider network 200. A user profile 470 may also be used to maintain configuration information for a particular device, such as a set of skills that are enabled for the device, a "wake word" or other trigger to activate voice capture, and/or metadata associated with one or more users of the device. For example, the user metadata may include a user's full name, a user's street address, a user's e-mail address, a user's phone number, a user's time zone, a user's preferred language, a user's geographical region, user preferences or other information that may be maintained as part of user profile(s) 470. Portions of the profile 470 information, such as the wake word or other voice-capturing trigger, may also be stored on the device itself. In one embodiment, a user profile 470 may be distinct or independent from a personal account associated with the user of the corresponding device. For example, an e-mail address associated with the device account may belong to the provider network 200 and not the user and may be unknown to the user. In one embodiment, user profiles 470 may be assigned to another "umbrella" account or a pool of accounts, such as a corporate account associated with an organizational customer of the service provider environment, e.g., for ease of device management.

Voice input analysis 410 may recognize voice commands 480 based on the voice command mappings 208, in various embodiments. Once API invocations are identified according to the voice command mappings, instructions to generate API requests may be provided to API request generation 430, in some embodiments. For example, an API request to list data objects stored in a data storage container may be generated (e.g., "ListObjects (storage container: "id"). In some embodiments, API request generation may include identity information, authorization tokens or other credentials to present as part of generating the API request. The authorization data 472 may be obtained from access management service 270 (which may evaluate account information or other identity information for user 402). For unauthorized API requests, API request generation may provide an indication to generate a voice error response to voice output generation 450 (which may provide the error response to voice output playback 414) (not illustrated), in some embodiments.

In some embodiments, additional information to that provided in the voice command may be used to generate the API request. User profile(s) 470 may, for instance, provide information for populating API parameters or values, such as the identity of associated resources, tasks, or other account information of user 402. As discussed above, and below with regard to FIG. 6, the identified source for API parameters may specify a user profile 470, and thus API request generation may access user profile(s) 470 to obtain the desired parameters. In this way, voice commands that utilize natural language to discover the object of a command (e.g., "my servers" "objects with a 'production' tag," etc.) can be interpreted and used to generate the API request with the appropriate parameter values (e.g., associating services with an account identifier for user 402 and/or a tag specified by the account of user 402). In addition or alternatively, other pieces of information may be used to generate or obtain parameters for API requests, such as contextual data about the user (e.g., the user's geographical location or history of contacting particular services), contextual information about a user device like a mobile phone, contextual data about the entity (e.g., the entity's regions of operation to disambiguate regional entities with similar names), and so on.

API request generation 430 may then submit the generate API requests 490 to the appropriate service 400. Voice command execution 206 may implement API response handling 440, in some embodiments, according to voice command mappings 208. Response handling 440 may determine how to parse, extract or provide results of the API responses 492 to voice output generation 450 for a response. In at least some embodiments, grouping or other pagination of results may be determined by API response handling 440. For example, API response handling 440 may group results by state or status (e.g., failed resources, then active resources, then standby resources, etc.). In some embodiments, API response handling 440 may determine how grouping of results are to be provided based on preferences or configuration information maintained as part of a user profile 470 (e.g., just give "name" and "status" and filter out other resource information). For example, the identified API command may result in one or more multiple items of information being returned to user 402 and voice command mappings 208 may indicate a template, wording, phrase, or other natural language response for handling API responses 492, in some embodiments Voice output generation 405 may receive API responses from API response handling 440 and generate command responses 482. For example, voice output generation 450 may generate audio output such as synthetic, computer-generated speech. The voice output may represent terms (e.g., words or phrases) specified according to an API response determined by API response handling 440.

In some embodiments, the voice capture device 410 may include or have access to a voice output playback component 414, including a speaker and/or other suitable audio-generating component(s), usable to play back audio output including computer-generated speech. In various embodiments, the voice output playback 414 may be located on board the device 410 or instead located in another device, such as a remote control. Voice interface service 202 may stream or otherwise send the command responses 482 to the device 410, and the device may play back the output for the user 402 using the voice output playback 414.

In at least some embodiments, service(s) 400 may provide event notifications to user 402 via voice interface service 202. For example, service(s) 400 may monitor for events that trigger a notification (e.g., task completion, failure scenarios, etc.), and send notification triggers 494 to notification management 460 at voice command execution. Notification management 460 may determine the natural language response and/or other information to include for the notification and instruct voice output generation 450 to send a notification 484 to voice capture device 410. Voice output playback 414 may then provide an auditory notification of the event that triggered the notification, in some embodiments. In this way, users can monitor for events using the voice interface service 202 without having to maintain an open interface or connection to check for the event's occurrence, in some embodiments.

Figure 3:
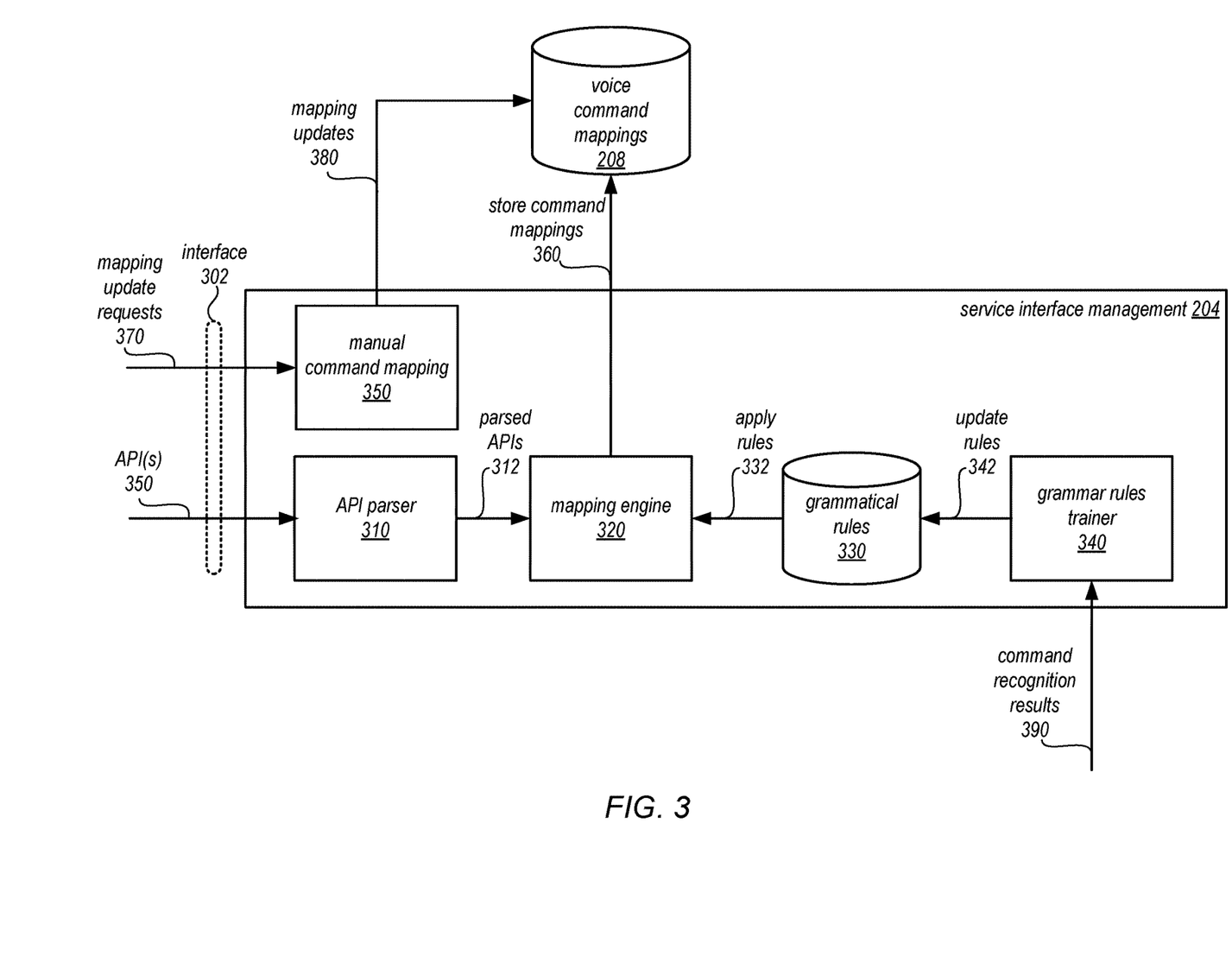
FIG. 3 is a logical block diagram illustrating service interface management for a voice interface service, according to some embodiments.
Figure 4:
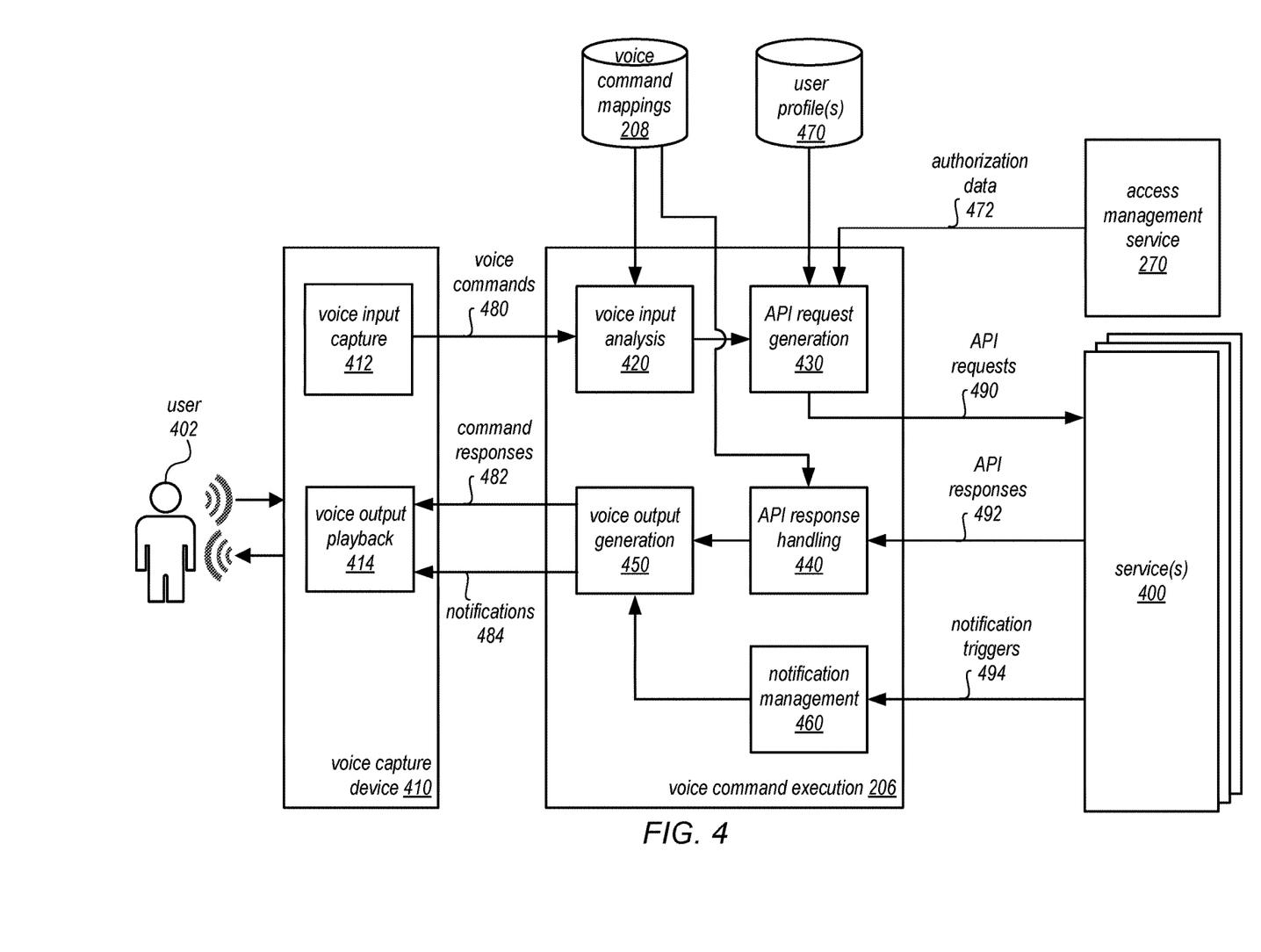
FIG. 4 is a logical block diagram illustrating voice command execution for a voice interface service, according to some embodiments.
Figure 5:
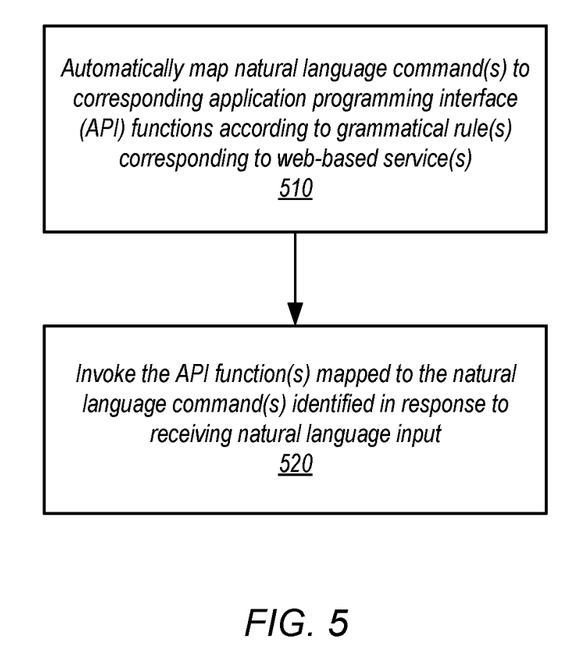
FIG. 5 is a high-level flowchart illustrating various methods and techniques to implement automatically mapping natural language commands to service application programming interfaces (APIs), according to some embodiments.

Although FIGS. 2-4 have been described and illustrated in the context of a provider network implementing a voice interface service for interacting with other provider network services, the various components illustrated and described in FIGS. 2-4 may be easily applied to other natural language interfaces, systems, or devices that provide access to web-based services. As such, FIGS. 2-4 are not intended to be limiting as to other embodiments of a system that may implement mapping natural language commands to service application programming interfaces (APIs). FIG. 5 is a high-level flowchart illustrating various methods and techniques to implement automatically mapping natural language commands to service application programming interfaces (APIs), according to some embodiments. Various different systems and devices may implement the various methods and techniques described below, either singly or working together. For example, a compliance management service and/or components within other services in a provider network such as described above with regard to FIGS. 2-4 may implement the various methods. Alternatively, a combination of different systems and devices may implement these methods. Therefore, the above examples and or any other systems or devices referenced as performing the illustrated method, are not intended to be limiting as to other different components, modules, systems, or configurations of systems and devices.

Natural language commands may offer users of network-based services opportunities to utilize less formal or strictly formalized requests to invoke the performance of various web-based service functionalities (e.g., via APIs). Voice-based natural language submissions (as well as text-based natural language submissions) can be used to trigger the performance of web-based service functionalities, according to various embodiments. As indicated at 510, natural language commands can be automatically mapped to corresponding application programming interface (API) functions according to grammatical rule(s) corresponding to web-based services, in various embodiments. For example, mapping can be automatically performed on the fly, in order to handle a natural language input that has been received (e.g., triggering a natural language mapping evaluation to identify the appropriate API to invoke in response to the natural language input). In other embodiments, automated mapping may be performed as part of an ingestion or submission process for APIs for different services, as discussed above with regard to FIG. 2.

Grammatical rules may be applied to link the features of an API to the features of natural language input that may be recognized as a command to perform the API, as discussed above with regard to FIG. 1. For example, grammatical rules may identify actions of APIs and objects of the actions (e.g., a service and resource(s) in the service) which the action involves, as discussed below with regard to FIG. 6. Grammatical rules may identify alternative formulations of words or phrases to invoke an API or may utilize common command structures or phrases with minimal differences to account for the same class of functionalities across different services (e.g., create, read, update, delete, start, stop, etc.), in some embodiments.

As indicated at 520, one or more of the API function(s) mapped to the natural language command(s) identified in response to receiving natural language input may be revoked, in various embodiments. For example, natural language input may be received via voice input or other natural language input techniques at a service, such as voice interface service 202 in FIG. 2, or other natural language interface system may analyze to the content of the natural language input to recognize the features or elements of a natural language command (e.g., applying segmentation, speech recognition, text predication, etc.). The action and object (e.g., including the service and resource, task, or operation) of the command may then be used to generate the corresponding API request to send to the web-service that implements the API.

Figure 6:
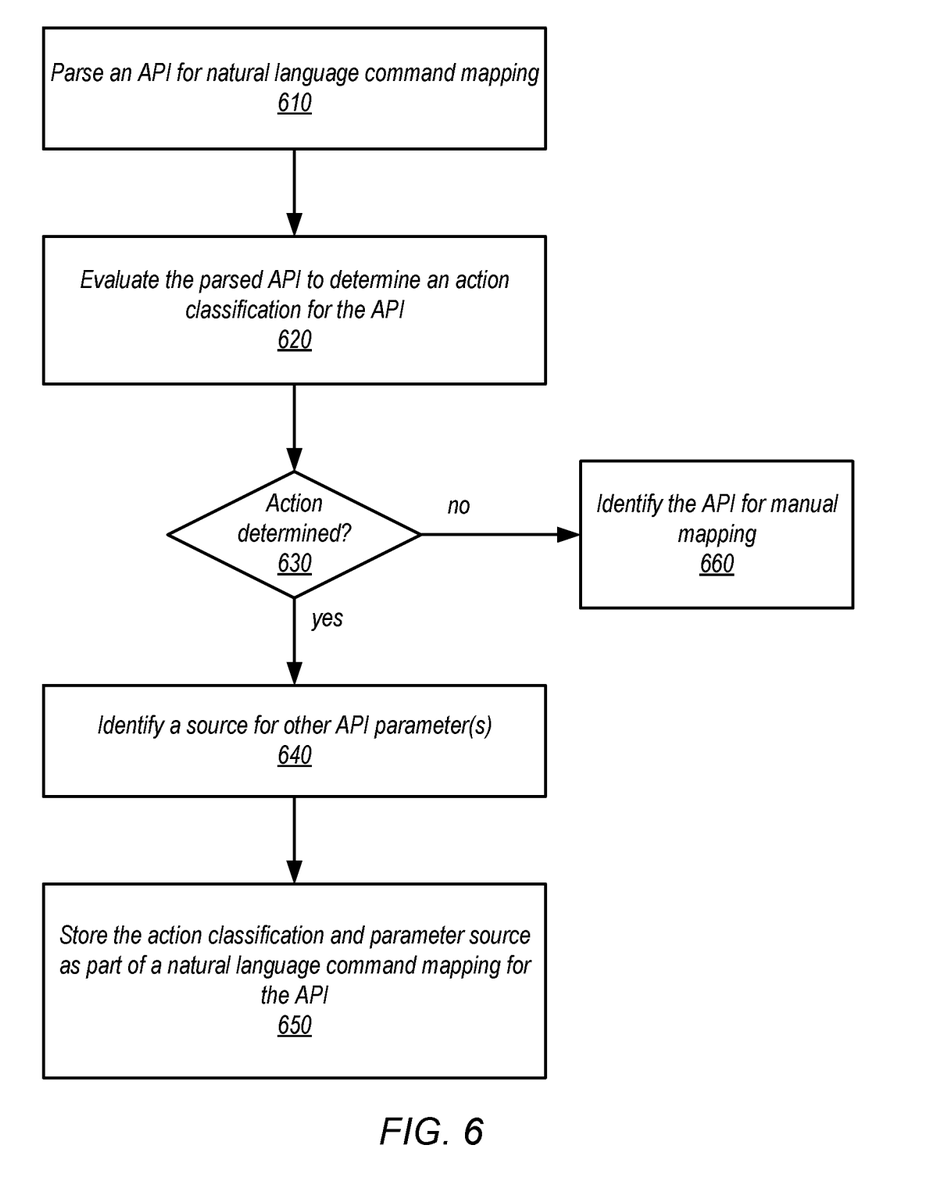
FIG. 6 is a high-level flowchart illustrating various methods and techniques to evaluate an API to map the API to a natural language command, according to some embodiments.

FIG. 6 is a high-level flowchart illustrating various methods and techniques to evaluate an API to map the API to a natural language command, according to some embodiments. As indicated at 610, an API for natural language command mapping may be parsed, in various embodiments. An API document, instruction, or other representation may be scanned for features, which may then be extracted and included in a parse structure for the API (e.g., a parse tree).

As indicated at 620, the parsed API may be evaluated to determine an action classification for the API, in some embodiments. For example, classification techniques, such as classification models generated based on machine-learning models) may be applied to identify an action grammar for the API (e.g., a create action, an update action, a delete action, a start action, etc.). The text of the API call may, for instance, indicate the classification of the API. In some embodiments, possible response, parameter values, and other information may also be used to identify the action. In some scenarios, no action can be determined for the API. As indicated by the negative exit from 630, the API may be identified for manual mapping, as indicated at 660, in various embodiments. For example, a notification may be sent via an interface that received a request to map the API that the API cannot be mapped without manual intervention, in some embodiments.

For those APIs with a classified action, a source for other API parameters may be determined, as indicated at 640, in various embodiments. For example, if the API allows for the specification of particular states (e.g., failed, paused, initialized, online, standby, etc.), then the source for the parameter to specify the state when generating the API request may be natural language input (e.g., allowing a user to specify the desired state(s)). For some APIs, a user profile, or other contextual information may be identified for determining parameter values (e.g., account identifier, access credentials, resource identifiers, tags, etc.).

As indicated at 650, the action classification and parameter source(s) may be stored as part of a natural language command mapping for the API, in some embodiments. For example, associated words, phrases, or other natural language command information may be linked to the actions and parameter values, in some embodiments, according to grammatical rules that specify the words, phrases or other natural language command information for commands of the identified classification and source(s).

The methods described herein may in various embodiments be implemented by any combination of hardware and software. For example, in one embodiment, the methods may be implemented by a computer system (e.g., a computer system as in FIG. 7) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 7:
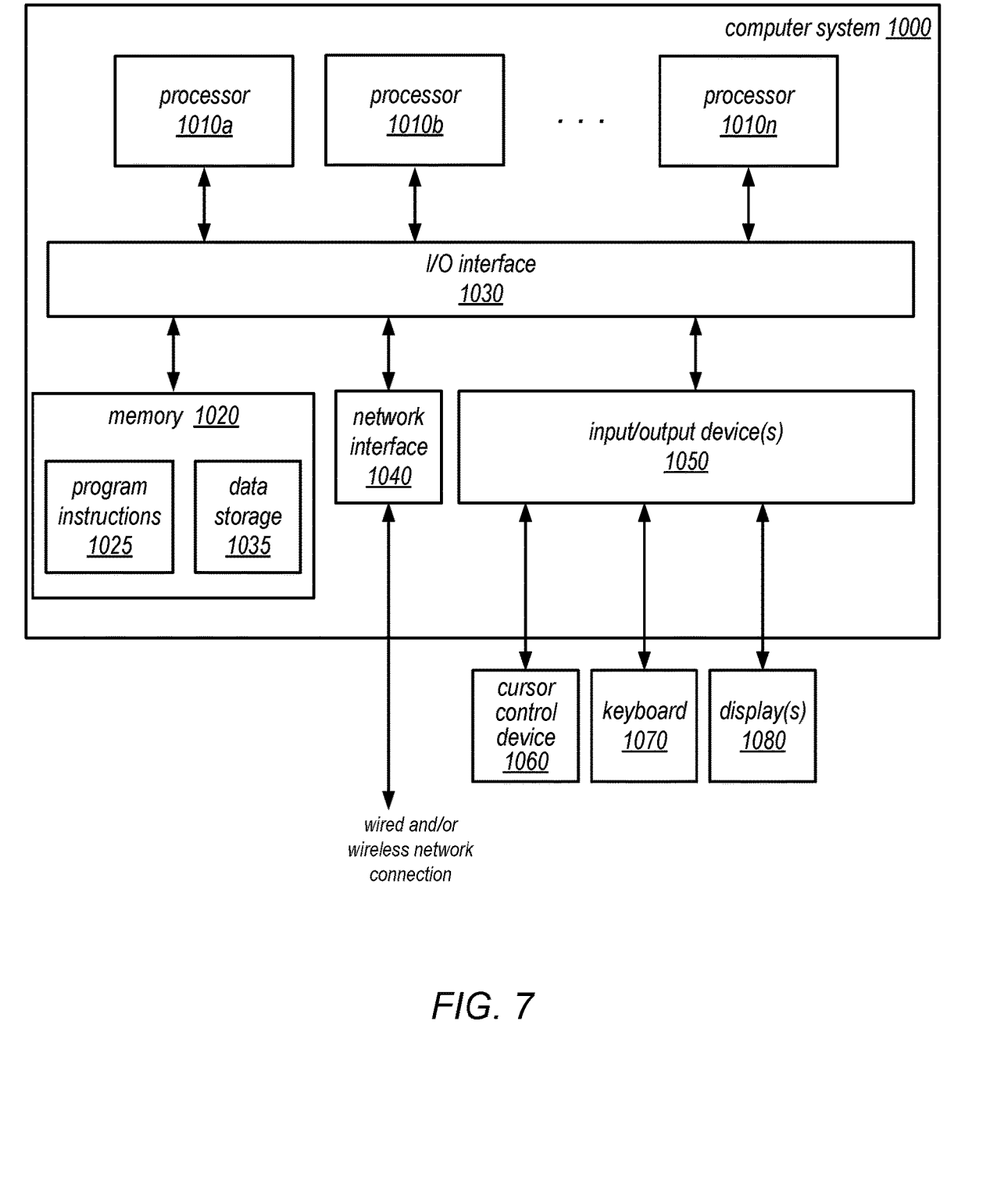
FIG. 7 illustrates an example system configured to implement the various methods, techniques, and systems described herein, according to some embodiments.

Embodiments of automatically mapping natural language commands to service application programming interfaces (APIs) as described herein may be executed on one or more computer systems, which may interact with various other devices. One such computer system is illustrated by FIG. 7. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, computing system, compute system, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 7, memory 1020 may include program instructions 1025, may implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the system embodiments described herein, or any of their components, may be implemented as one or more web services. For example, leader nodes within a data warehouse system may present data storage services and/or database services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   a memory to store program instructions which, if performed by at least one processor, cause the at least one processor to perform a method to at least:
   receive a request to map one or more application programming interface (API) functions to one or more natural language commands;
   responsive to the request, evaluate the one or more application programming interface (API) functions according to one or more grammatical rules that apply a common command structure to a plurality of different web-based services to automatically generate a mapping of the one or more natural language commands to a corresponding one or more of the application programming interface (API) functions;
   after the mapping is generated, receive a voice input captured at a voice capture device;
   identify one of the one or more natural language commands in the voice input according to the generated mapping; and
   in response to the identification of the one natural language command in the voice input, send a request to invoke one of the API functions to one of the web-based services mapped to the one of the one or more natural language commands.

2. The system of claim 1, wherein to evaluate the one or more application programming interface (API) functions according to the one or more grammatical rules to automatically generate the mapping of the one or more natural language commands to the corresponding one or more application programming interface (API) functions, the program instructions cause the at least one processor to perform the method to determine respective action classifications for the API functions.

3. The system of claim 1, wherein the program instructions further cause the at least one processor to perform the method to:
   modify the mapping between one of the API functions and one of the natural language commands in response to a request to modify the mapping.

4. The system of claim 1, wherein the at least one processor and the memory are implemented as part of a voice interface service for a provider network that includes the web-based services, wherein the voice input received from a voice capture device via a network connection between the voice capture device and the voice interface service.

5. A method, comprising:
   receiving a request to map one or more application programming interface (API) functions to one or more natural language commands;
   responsive to the request, evaluating one or more application programming interface (API) functions according to one or more grammatical rules that apply a common command structure to a plurality of different web-based services to automatically generate a mapping of the one or more natural language commands to a corresponding one or more of the application programming interface (API) functions;
   after the mapping is generated, receiving a natural language input; and
   invoking the corresponding one of the API functions mapped to a particular natural language command identified within the received natural language input.

6. The method of claim 5, further comprising:
   identifying the particular one of the natural language commands in a natural language input.

7. The method of claim 6, wherein invoking one of the API functions for one of the web-based services comprises obtaining access credentials for a user associated with the natural language input.

8. The method of claim 5, wherein evaluating the one or more application programming interface (API) functions according to one or more grammatical rules to automatically generate the mapping of the one or more natural language commands to the corresponding one or more application programming interface (API) functions comprises determining respective action classifications for the API functions.

9. The method of claim 8, wherein evaluating the one or more application programming interface (API) functions according to one or more grammatical rules to automatically generate the mapping of the one or more natural language commands to the corresponding one or more application programming interface (API) functions further comprises identifying a source for one or more parameter values for the API functions.

10. The method of claim 9, wherein the identified source for at least one of the API functions is a user profile of a user associated with a natural language input from which one of the natural language commands is identified.

11. The method of claim 5, further comprising modifying one or more of the grammatical rules based, at least in part, on one or more machine learning techniques, wherein one or more other API functions for the web-based services or another web-based service are automatically mapped according to the modified grammatical rules.

12. The method of claim 5, further comprising:
   modifying the mapping between one of the API functions and one of the natural language commands in response to a request to modify the mapping.

13. The method of claim 5, further comprising:
   performing the evaluating the one or more application programming interface (API) functions according to one or more grammatical rules to automatically generate the mapping of the natural language commands in response to receiving one or more requests to map the API functions of the web-based services.

14. A non-transitory, computer-readable storage medium, storing program instructions that when executed by one or more computing devices cause the one or more computing devices to implement:
- receiving a request to map one or more application programming interface (API) functions to one or more natural language commands;
- responsive to the request, evaluating the one or more application programming interface (API) functions corresponding to one or more web-based services according to one or more grammatical rules that apply a common command structure to a plurality of different web-based services to automatically generate a mapping of the one or more natural language commands to a corresponding one of the application programming interface (API) functions; and
- selecting one of the API functions corresponding to one of the natural language commands using the generated mapping and invoking the selected one of the API functions for one of the web-based services mapped to the one of the natural language commands in response to identifying the one of the natural language commands in a natural language input.

15. The non-transitory, computer-readable storage medium of claim 14, wherein, in evaluating the one or more application programming interface (API) functions according to one or more grammatical rules to automatically generate the mapping of the one or more natural language commands to the corresponding one or more application programming interface (API) functions, the program instructions cause the one or more computing devices to implement determining respective action classifications for the API functions.

16. The non-transitory, computer-readable storage medium of claim 14, wherein the natural language input is a voice input and wherein the program instructions cause the one or more computing devices to further implement:
- providing a voice output to a device that captured the voice input in order to provide a response to the invoked API.

17. The non-transitory, computer-readable storage medium of claim 14, wherein the natural language input is a voice input and wherein the program instructions cause the one or more computing devices to further implement:
- providing a voice output to a device that captured the voice input in response to a notification trigger received from one of the web-based services.

18. The non-transitory, computer-readable storage medium of claim 14, wherein the program instructions cause the one or more computing devices to further implement:
- receive one or more other API functions for the web-services or another web service; and
- identify the or more other API functions for manual mapping to the natural language commands based, at least in part, on an evaluation to determine respective action classifications for the other API functions.

19. The non-transitory, computer-readable storage medium of claim 14, wherein the program instructions cause the one or more computing devices to further implement:
- modifying the mapping between one of the API functions and one of the natural language commands in response to a request to modify the mapping.

20. The non-transitory, computer-readable storage medium of claim 14, wherein the one or more computing devices are implemented as part of a voice interface service for a provider network that includes the web-based services, wherein the natural language input is voice input received from a voice capture device via a network connection between the voice capture device and the voice interface service.

* * * * *